(12) United States Patent
Kasper et al.

(10) Patent No.: US 10,580,329 B2
(45) Date of Patent: Mar. 3, 2020

(54) STABILIZING A DETACHABLE ITEM ON A PRINTABLE SUBSTRATE

(71) Applicant: Precision Dynamics Corporation, Valencia, CA (US)

(72) Inventors: Matthew Kasper, Oak Creek, WI (US); Harry Miesner, Wauwatosa, WI (US)

(73) Assignee: Precision Dynamics Corporation, Valencia, CA (US)

( * ) Notice: Subject to any disclaimer, the term of this patent is extended or adjusted under 35 U.S.C. 154(b) by 16 days.

(21) Appl. No.: 15/822,045

(22) Filed: Nov. 24, 2017

(65) Prior Publication Data
US 2018/0174496 A1 Jun. 21, 2018

Related U.S. Application Data

(60) Provisional application No. 62/425,969, filed on Nov. 23, 2016.

(51) Int. Cl.
| | | |
|---|---|---|
| G09F 3/10 | (2006.01) | |
| G09F 3/00 | (2006.01) | |
| B32B 5/02 | (2006.01) | |

(52) U.S. Cl.
CPC .......... *G09F 3/10* (2013.01); *B32B 5/02* (2013.01); *G09F 3/005* (2013.01); *G09F 3/0288* (2013.01)

(58) Field of Classification Search
CPC ........... G09F 3/10; G09F 3/005; G09F 3/0288
See application file for complete search history.

(56) References Cited

U.S. PATENT DOCUMENTS

| | | | | |
|---|---|---|---|---|
| 8,066,306 | B1* | 11/2011 | Valenti, Jr. .............. | G09F 3/005 283/75 |
| 2007/0120358 | A1* | 5/2007 | Waggoner ............... | G09F 3/005 283/81 |
| 2011/0007374 | A1* | 1/2011 | Heim ..................... | G03F 1/0244 359/2 |
| 2011/0012337 | A1* | 1/2011 | Heim ..................... | B42D 25/29 283/94 |
| 2011/0049168 | A1* | 3/2011 | Loftin .................. | B32B 43/003 220/694 |
| 2013/0014690 | A1* | 1/2013 | Shirase ................... | C09K 9/02 116/207 |
| 2015/0184038 | A1* | 7/2015 | Schaner ................. | B05D 3/007 428/41.8 |
| 2015/0294602 | A1* | 10/2015 | Read ..................... | B41M 5/337 428/216 |

(Continued)

*Primary Examiner* — Gary C Hoge
(74) *Attorney, Agent, or Firm* — Quarles & Brady LLP

(57) ABSTRACT

The present disclosure describes various example multi-layer printing sheets, and systems and methods for manufacturing the same. An example printing sheet comprises: a die-cut or perforated printable film portion; an adhesive layer; a clear ink layer; and a bottom layer. The printable film portion may be die-cut or perforated to form a band shape. A release layer may be placed between the adhesive layer and the bottom layer or the adhesive layer and the clear ink layer. A portion of the printing sheet may include a die cut printable paper portion; the printable paper portion comprises a printable paper layer includes one or more labels die cut into it; and the printable paper layer is connected to the bottom layer via an adhesive. A release may be placed between the adhesive layer and the bottom layer of the printable paper portion.

18 Claims, 15 Drawing Sheets

Concept 1 – cross-section view

(56) References Cited

U.S. PATENT DOCUMENTS

2016/0129680 A1* 5/2016 Ikeda .................... B41M 3/008
 156/275.5
2017/0337851 A1* 11/2017 Guzzo .................... G02B 5/02
2017/0361211 A1* 12/2017 Gaynor ................ B42D 15/025

* cited by examiner

300

350

400

450

Concept #3

Top view

Cross-section view

US 10,580,329 B2

STABILIZING A DETACHABLE ITEM ON A PRINTABLE SUBSTRATE

RELATED APPLICATION

This application claims the benefit of U.S. provisional patent application Ser. No. 62/425,969, entitled "Stabilizing a Detachable Item on a Printable Substrate," filed Nov. 23, 2016, which is hereby incorporated by reference in its entirety.

TECHNICAL FIELD

The present disclosure generally relates to multi-layer printing sheets and more specifically to stabilizing a detachable item or portion on a printable substrate of a multi-layer printing sheet.

BACKGROUND

Wearable bands, e.g., wristbands and ankle bands, are commonly used for identification purpose. For example, patient information, e.g., a patient's name, date of birth, and admittance date, may be printed onto a paper wristband for the patient to wear on her person during a hospital stay so that medical professionals can easily identify the patient and her medical history.

Most wearable identification bands are not printed in their final use form—a non-sheet-like form (e.g., a strip shape), however, because existing printers are oftentimes incapable of processing printing sheets that are of non-standardized dimensions. A standard-dimensioned printing sheet (sometimes referred to as a carrier sheet) may be used to carry an identification band during a printing process; after the printing is completed, the band can be removed from the carrier sheet and for use in its final form. A wristband sheet may be used as a carrier sheet; a single wristband sheet may include two or more wristband portions and label portions.

A wristband sheet may consist of several layers, one of which is a printable layer, e.g., a layer on which data may be printed. One of the existing technical problems is that a printable layer is often cut out of a substrate's top layer and not sufficiently affixed to the substrate's bottom layer. When such a wristband sheet is fed through a printer, the detachable but left unsecured wristband portion of the wristband sheet may move, resulting in the wristband being wrinkled or otherwise having low print quality or the printer being jammed. The above identified technical problems are reduced or eliminated by the apparatuses, systems, and methods disclosed in the present disclosure.

Figure 1:
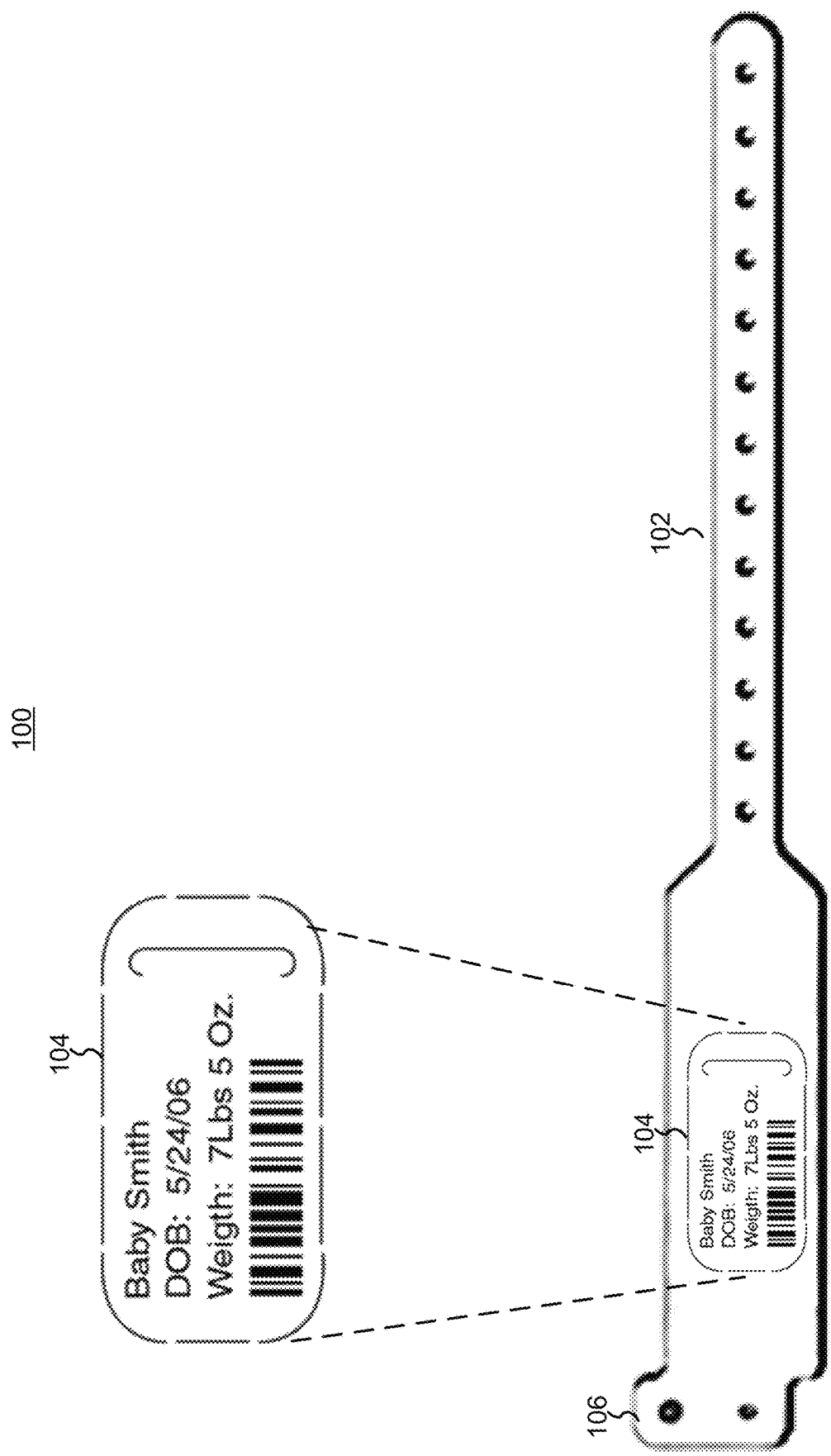
FIG. 1 is a block diagram illustrating a wearable band having a printed label.

Embodiments of the present disclosure and their advantages are best understood by referring to the detailed description that follows. It should be appreciated that like reference numerals are used to identify like elements illustrated in one or more of the figures; showings therein are for purposes of illustrating embodiments of the present disclosure and not for purposes of limiting the same.

SUMMARY

Embodiments of a multi-layer printing sheet including a portion that is detachable from the printing sheet, as well as method and computer executable instructions for stabilizing the detachable portion on a printable layer of a multi-layer printing sheet are provided in the present disclosure.

A printing sheet, in some implementations, comprises: a die-cut or perforated printable film portion; an adhesive layer; a clear ink layer; and a bottom layer.

The printable film portion in some implementations is die-cut or perforated to form a band shape.

A release layer, in some implementations, is between the adhesive layer and the bottom layer or the adhesive layer and the clear ink layer.

A portion of the printing sheet, in some implementations, includes a die cut printable paper portion; the printable paper portion comprises a printable paper layer includes one or more labels die cut into it; and the printable paper layer is connected to the bottom layer via an adhesive.

A release, in some implementations, is placed between the adhesive layer and the bottom layer of the printable paper portion.

A portion of the adhesive layer underneath the die cut shape is absent or missing, in some implementations.

The adhesive layer, in some implementations, includes a low tack adhesive portion.

The adhesive layer, in some implementations, includes a release layer underneath a portion of the adhesive layer.

The bottom layer, in some implementations, includes a printable paper layer, an adhesive layer, and a liner layer.

A portion of the printing sheet, in some implementations, includes one or more labels die cut into the paper layer.

A portion of the liner layer has release coating attached to it and adhesive attached to the release coating is also attached to a laser receptive paper.

A release layer, in some implementations, is placed underneath at least a portion of the clear ink layer.

A portion of the printing sheet, in some implementations, includes a die-cut printable paper portion with a printable paper layer having one or more labels die cut into it; and the printable paper layer is connected to the bottom layer via an adhesive.

In some implementations, the die-cut or perforated printable film portion is partially die-cut or perforated.

The die-cut or perforated printable film portion, in some implementations, is configured to be printed with an image or an encrypted text.

The image or the encrypted text, in some implementations, identifies an individual receiving medical care at a medical facility.

The image or the encrypted text, in some implementations, is configured to be read by a mobile or stationary scanner to identify an individual receiving medical care at a medical facility.

The image or the encrypted text, in some implementations, is configured to be read by a camera installed on a mobile phone.

A second printing sheet, may comprise: a laser receptive paper layer; an adhesive layer below the laser receptive paper layer; a laser receptive film layer adhered to a portion of the adhesive layer; and a liner with release coating adhered to the remaining portion of the adhesive layer not attached to the laser receptive film layer. A first portion of the laser receptive film layer and a second portion of the adhesive layer have been removed such that a third portion of the laser receptive film layer is exposed; a second portion of the laser receptive film layer has a release coating or ink in between the laser receptive film layer and the adhesive layer;

A third printing sheet, may comprise: a laser receptive film adhered to a liner where a portion of the film has a release coating attached to the film, then an adhesive attached to the release coating, then the liner. Another portion of the film the adhesive attached to the film then a release coating attached to the adhesive and the liner attached to the release coating.

A computer-implemented method for manufacturing a multi-layer printing sheet as described in any of the implementations above.

A non-transitory computer readable medium comprising computer executable instructions stored thereon, which, when executed by one or more computers, cause a machine to manufacture a multi-layer printing sheet as described in any of the implementations above.

DETAILED DESCRIPTION

The present disclosure describes various implementations of multi-layer wristband sheets, as well as systems and methods for manufacturing the same. The technologies described in the present disclosure can provide the following technical advantages. First, the detachable portions of a wristband sheet, e.g., a wristband portion or a label portion, are more secured to a substrate of the wristband sheet, reducing unexpected movements of these portions during printing, enhancing printing quality, and reducing printer jamming. Second, the detachable portions remain easily separable from the wristband sheet after the printing process is completed; the usability of the wristband sheet is not diminished. Additional details of implementations are now described in relation to the Figures.

FIG. 1 is a block diagram illustrating a wearable band 100 having a printed label.

As shown in FIG. 1, the wearable band 100 has a non-sheet-like form; namely, the band 100 includes a perforated strip 102, a label portion 104, and a buckle portion 106. The perforated strip 102 and the buckle portion 106 may be used together as a locking mechanism to secure the band 100 to a person's wrist, ankle, hand, or foot. The label portion 104 is an area (1) onto which data may be printed directly or (2) to which a printed data label may be affixed. For example, a patient's identification information may be printed directly in the label portion 104, because the identification information (e.g., the patient's name or date of birth) is not expected to change frequently; for another example, a medical checklist may be glued to the label portion 104, because the check list may be updated or replaced numerous times as a patient goes through various stages of a checkup process.

Figure 2A:
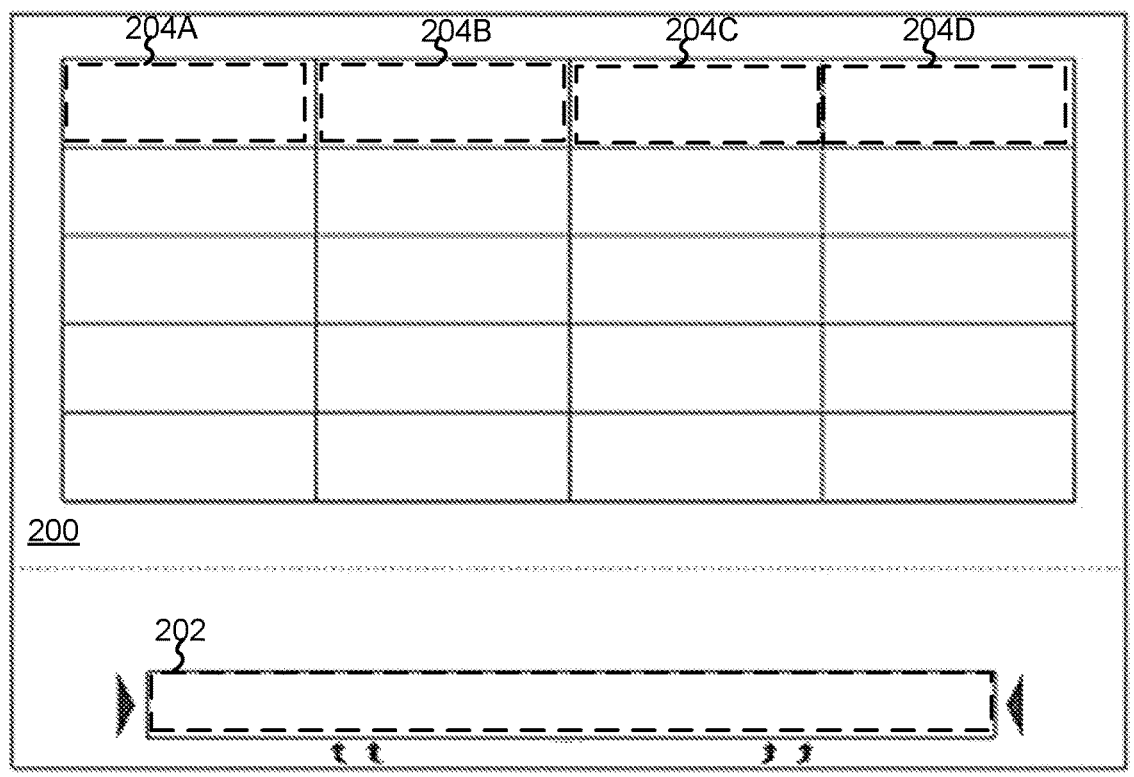
FIG. 2A is a block diagram illustrating a multi-layer printing sheet including several labels, and a wearable band that is detachable from the printing sheet.

FIG. 2A is a block diagram illustrating a multi-layer printing sheet 200 including several labels, and a wearable band that is detachable from the printing sheet.

As shown in FIG. 2, the wristband sheet 200 includes a band portion 202 and several label portions, for example, labels 204A, 204B, 204C, and 204D. Providing multiple labels on a same wristband sheet is technically advantageous, as it allows labels having the same information to be affixed to different articles or locations for the purpose of cross-referencing and identification. For example, the labels 204A-204C may be affixed to different medication bottles of the same patient; while the label 204D may be affixed to the patient's wristband. For a printing sheet having two more labels, it becomes more important to stabilize the labels during printing, because the label may move in the same or even different manners.

Figure 2B:
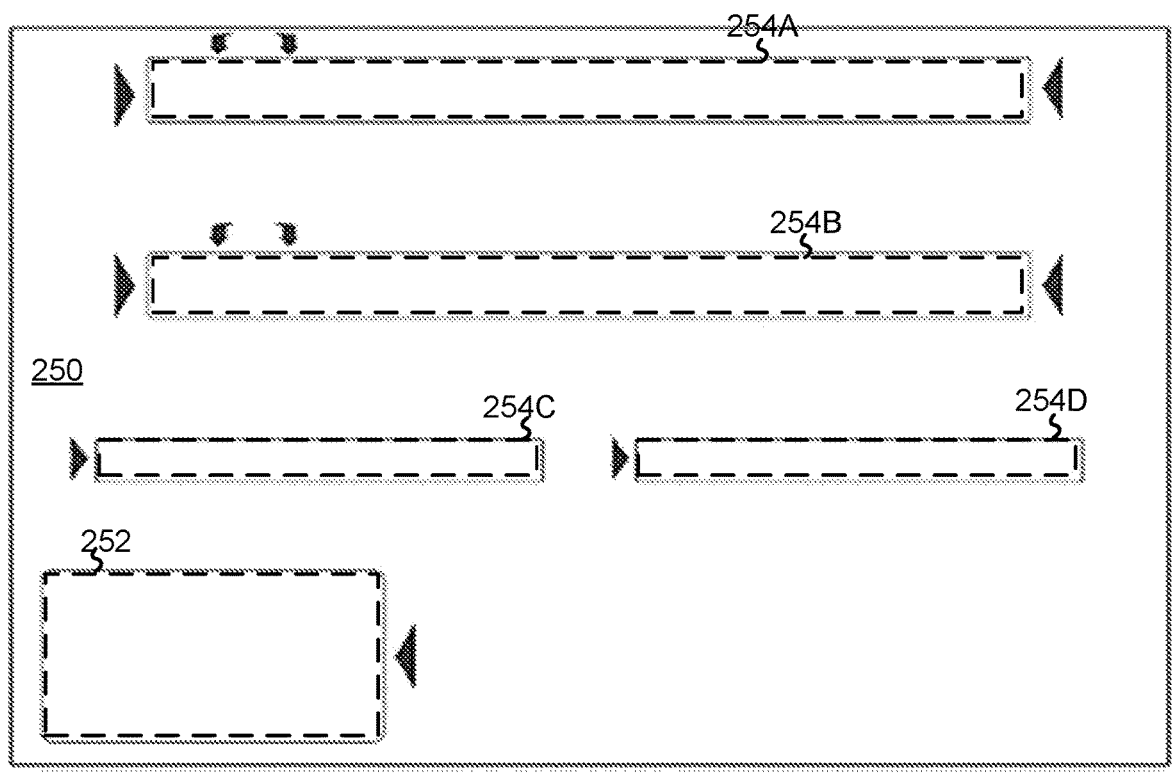
FIG. 2B is a block diagram illustrating a multi-layer printing sheet including a label, and several wearable bands that are detachable from the printing sheet.

FIG. 2B is a block diagram illustrating a multi-layer printing sheet 250 including a label, and several wearable bands that are detachable from the printing sheet.

As shown in FIG. 2B, the wristband sheet 250 provides multiple band portions, e.g., wristbands 254A, 254B, 254C, and 254D, and a label 252. Providing multiple wristband portions on a same wristband sheet is technically advantageous, as it allows several wristbands having the same or related information to be printed at the same time and distributed to different individuals to show a relationship among these different individuals.

Figure 3A:
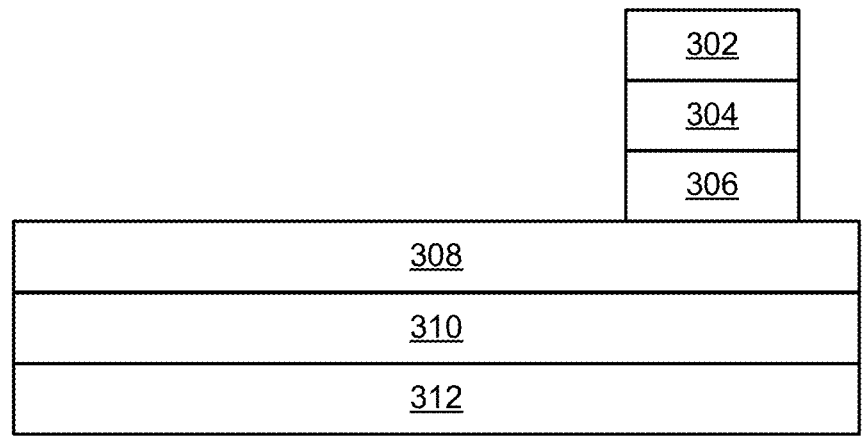
FIG. 3A is a block diagram illustrating a cross section view of a first example multi-layer printing sheet including a wearable band that is detachable from the printing sheet.

FIG. 3A is a block diagram illustrating a cross section view 300 of a first example multi-layer printing sheet including a wearable band that is detachable from the printing sheet.

As shown in the cross section view 300, the wrist band portion of the printing sheet may have three top layers (e.g., layers 302-306) in addition to the three bottom layers (e.g., layers 308-312).

The layer 302 may include a laser receptive film onto which a laser printer may print data, which may include patient identification information, health care data, and one or more encoded images (e.g., a bar code, a UPC code, or a QR code). Printing encoded data, rather than plain text, on a wearable band can protect data that may be considered private, e.g., an individual's name, date of birth, or medical conditions or symptoms. The encoded data may be read by a scanner or a mobile phone to quickly identify the patient carry the medical wristband or ankle band. This is particularly beneficial at medical care facilities where patients and their medical history may need to be identify as soon as possible. In some embodiments, the layer 302 may also be printed using an impact printer, an ion deposition printer, an ink jet printer, a laser printer, a direct thermal printer, and a thermal transfer printer. In some other embodiments, the layer 302 may be a thermal printable film or a substrate that is receptive to imaging via other means.

The layer 304 may be an adhesive layer. The adhesive layer 304 may include pressure sensitive adhesive, such as low tack adhesive (can also be referred to as coupon adhesive, no tack adhesive, or dry tack adhesive), which allows the laser receptive film layer 302 to be conveniently attached and secured to, and removed from a printing sheet. Low tack or no tack adhesive oftentimes leaves no residue on the substrate to which it is applied and does not sacrifice the separability of the wristband from the printing sheet.

As explained below, the adhesive may be applied to a clear ink layer 306 that is placed between a printable film and a paper layer (e.g., the layer 302 and the layer 308, respectively). The adhesive serves to restrain movements of the film 302 on the paper layer 308 during printing. The clear ink layer 306 fills in the pores of the paper layer 308. This creates an even surface for the adhesive layer 304. Applying adhesive to an even, non-porous surface means even amounts of adhesive are available to evenly secure the laser receptive film layer 302. Evenly securing the laser receptive film layer 302 restrains movement of the film layer 302 on the paper layer 308 during printing.

The layer 310 may be another adhesive layer similar to the layer 304; and the layer 312 may be a liner layer. As shown in the view 300, the label portion of the printing sheet may have the three bottom layers (e.g., layers 308-312), but without the three top layers. The label portion may include multiple labels (as shown in FIG. 2) or a single label (as shown in FIG. 3).

Figure 3B:
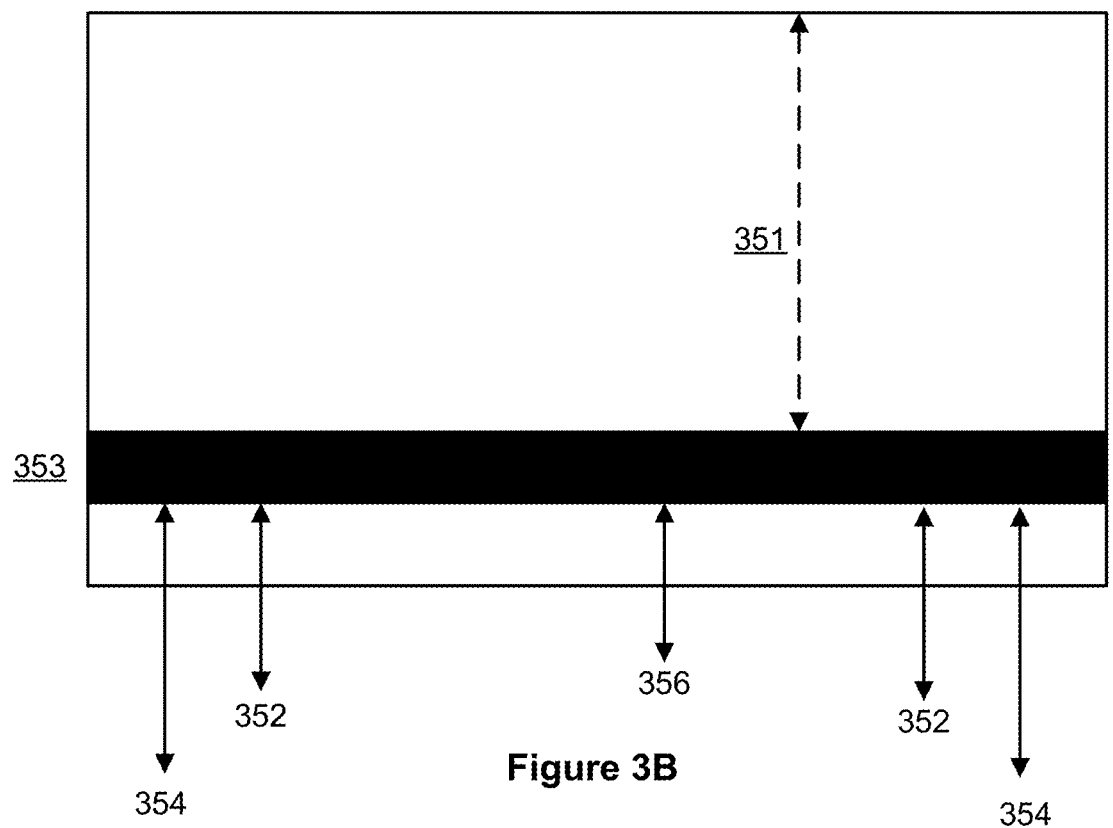
FIG. 3B is a block diagram illustrating a top view of the multi-layer printing sheet described in FIG. 3A.

FIG. 3B is a block diagram illustrating a top view 350 of the multi-layer printing sheet described in FIG. 3A.

As shown in the top view 350, the top portion 351 of the printing sheet may be the label area, which may include one or more labels. The dark strip 353 demonstrates the wristband portion.

The areas 352 are adhesive tab areas on the paper layer 308; tack down adhesive may be applied to the areas 354 between the film 302 and the paper 308 to affix the corresponding arrowed portions of the film 302 to the paper 308; and low or no tack adhesive is applied to the area 356 between the film 302 and the paper 308 to sufficiently secure the film 302 to the paper 308 for the purpose of printing, but without diminishing the ease of detaching the film from the paper 308 when needed.

Using technologies described with reference to FIGS. 3A and 3B, a wristband can sufficiently secured to the wristband sheet when printing, such that no wrinkling or jamming occurs. After the printing is completed, the wristband portion between the two areas 352 can be conveniently separated from the areas 354 and removed from the printing sheet.

Figure 4A:
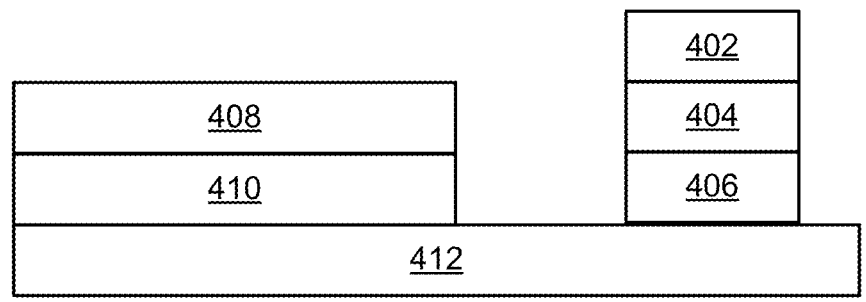
FIG. 4A is a block diagram illustrating a cross section view of a second example multi-layer printing sheet including a wearable band that is detachable from the printing sheet.

FIG. 4A is a block diagram illustrating a cross section view 400 of a second example multi-layer printing sheet including a wearable band that is detachable from the printing sheet.

As shown in the cross section view 400, the wrist band portion of the printing sheet may have four layers (e.g., layers 402-406 and 412); and the label portion may have three layers (e.g., layers 408-412).

Similar to the technologies described with reference to FIG. 3A, the layer 402 is a laser receptive film layer; the layer 404 is an adhesive layer; the layer 406 is a clear ink layer; the layer 408 is a laser receptive paper layer; the layer 410 is another adhesive layer; and the layer 412 shared by the wristband portion and the label portion is a liner layer 412. The liner layer 412 may be a coated paper layer with areas of release agents printed thereon so that either the film, or the paper, or both can be conveniently removed from the liner 412.

Figure 4B:
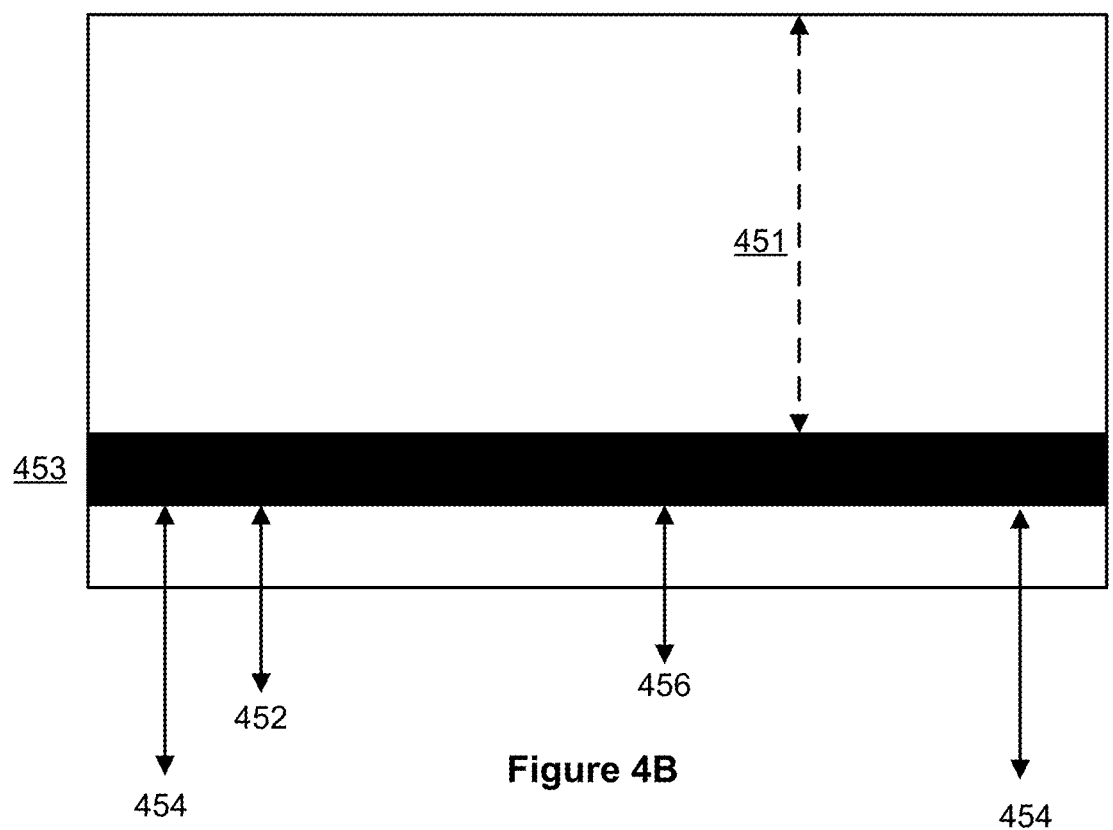
FIG. 4B is a block diagram illustrating a top view of the multi-layer printing sheet described in FIG. 4A.

FIG. 4B is a block diagram illustrating a top view 450 of the multi-layer printing sheet described in FIG. 4A.

As shown in the top view 450, the top portion 451 of the printing sheet may be the label area; and the dark strip 453 illustrates the wristband portion.

The area 452 is an adhesive tab area covered with release agent, which prevents bonding to on the liner 412. The areas 454 include tack down adhesive filled between the laser receptive film 402 and the laser receptive paper 408. The area 456 includes low or no tack adhesive to secure the wristband to the printing sheet. The wristband may also be perforated at one end (e.g., the right end) to make it even easier to remove the wristband form the printing sheet.

Figure 5A:
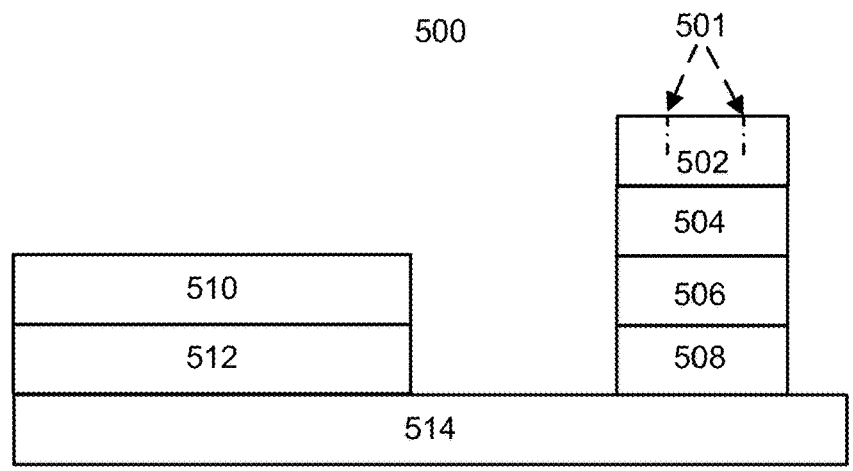
FIG. 5A is a block diagram illustrating a cross section view of a third example multi-layer printing sheet including a wearable band that is detachable from the printing sheet.

FIG. 5A is a block diagram illustrating a cross section view 500 of a third example multi-layer printing sheet including a wearable band that is detachable from the printing sheet.

As shown in the cross section view 500, the wrist band portion of the printing sheet may have five layers (e.g., layers 502-508 and 514); and the label portion may have three layers (e.g., layers 510-514).

The layer 502 is a laser receptive film layer with one or more die cuts (illustrated by dotted lines 501). The die cuts provide additional pressure to secure the wristband portion to the printing sheet, further reducing the possibility of wrinkling. This is particularly advantageous, when an industrial printer, which is less adapted at maintaining paper-pulling force consistent, is used to print the identification bands.

Similar to the technologies described with reference to FIGS. 3A and 4A, the layer 504 is an adhesive layer; the layer 506 is a clear ink layer; the layer 510 is a laser receptive paper layer; and the layer 512 is another adhesive layer. The layer 508 shown in FIG. 5B is covered with release agent; and the liner 514 is shared by both the wrist band portion and the label portion.

Figure 5B:
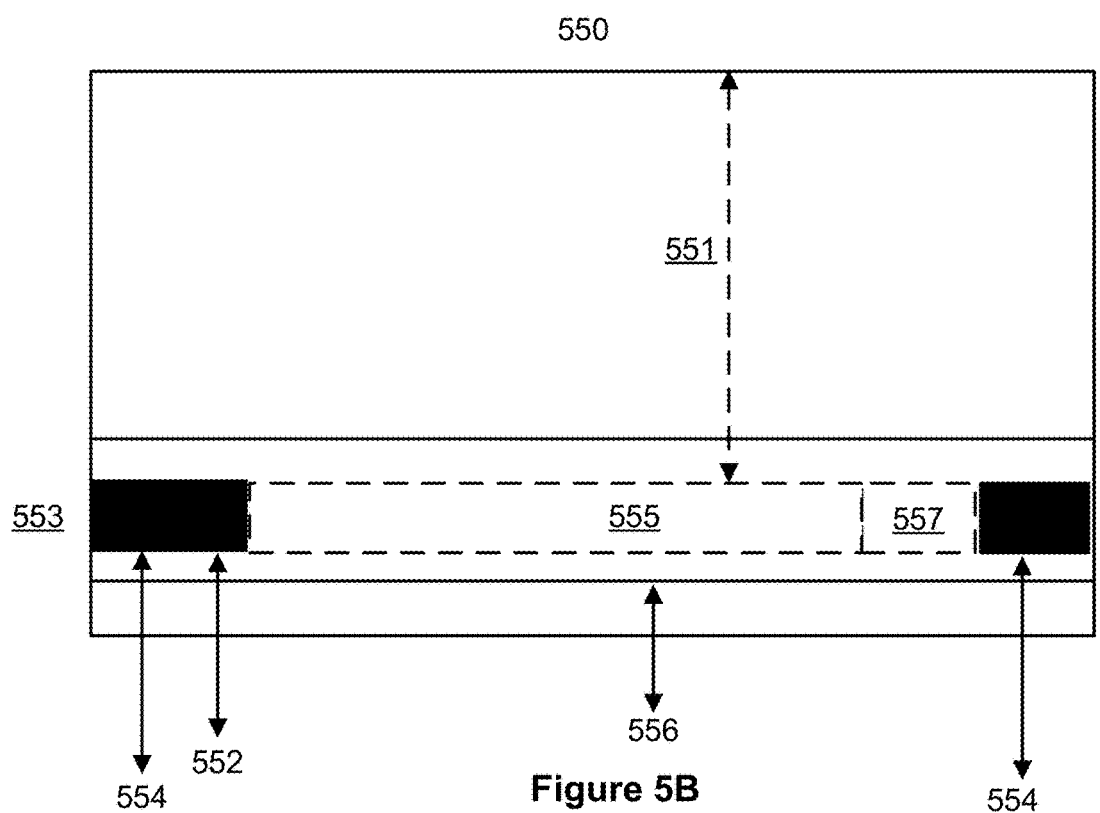
FIG. 5B is a block diagram illustrating a top view of the third example multi-layer printing sheet described in FIG. 5A.

FIG. 5B is a block diagram illustrating a top view 550 of the third example multi-layer printing sheet described in FIG. 5A.

As shown in the top view 550, the top portion 551 and the strip 553 demonstrate the label portion and the wristband portion of the printing sheet, respectively. Area 552 is an adhesive tab area on the paper liner. Similar to the technologies discussed with references to FIGS. 3B and 4B, areas 554 represent the locations where tack down adhesive may be used to secure the film 502 to the paper layer 510. Note that in some implementations, clear ink is applied to the area 555 and 557; and that, in some implementations, clear ink is applied to only the area 555 and 557, but not the area 552 and the areas 554. These technologies are advantageous, because areas where tack down adhesive has been or will be applied will not become part of the wristband. The benefit of having a uniformed degree of release provided in these areas is thus not essential.

Besides the use of die cut discussed with reference to FIG. 5A, initiation die cuts may also be used proximate to one of the areas 552 to further increase the ease of removing the wristband from the printing sheet.

Figure 6A:
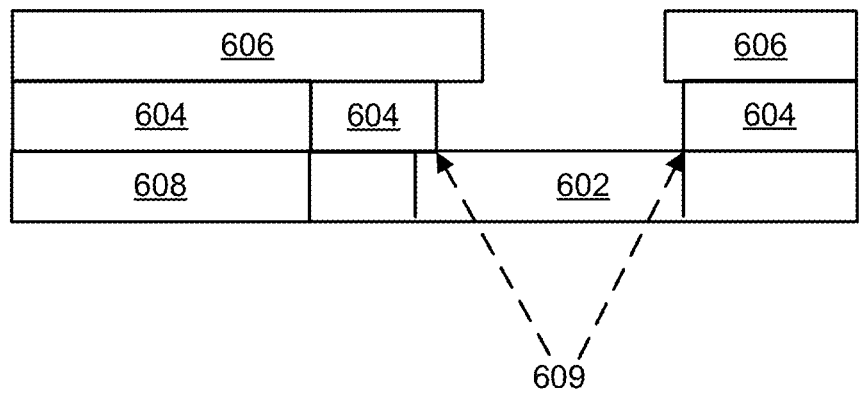
FIG. 6A is a block diagram illustrating a cross section view of a fourth example multi-layer printing sheet including a wearable band that is detachable from the printing sheet.

FIG. 6A is a block diagram illustrating a cross section view 600 of a fourth example multi-layer printing sheet including a wearable band that is detachable from the printing sheet.

As shown in the cross section view 600, layer 602 is a laser receptive film layer; layers 604 are adhesive layers; layers 606 are laser receptive paper layers; and layer 608 is a liner layer.

As shown in FIG. 6A, a portion of the paper layer 606 has been removed, for example, by die-cut. The layer 602 located underneath the two paper layers 606 is the wristband portion. Releases 608 may be printed around the edges surrounding the exposed area.

Figure 6B:
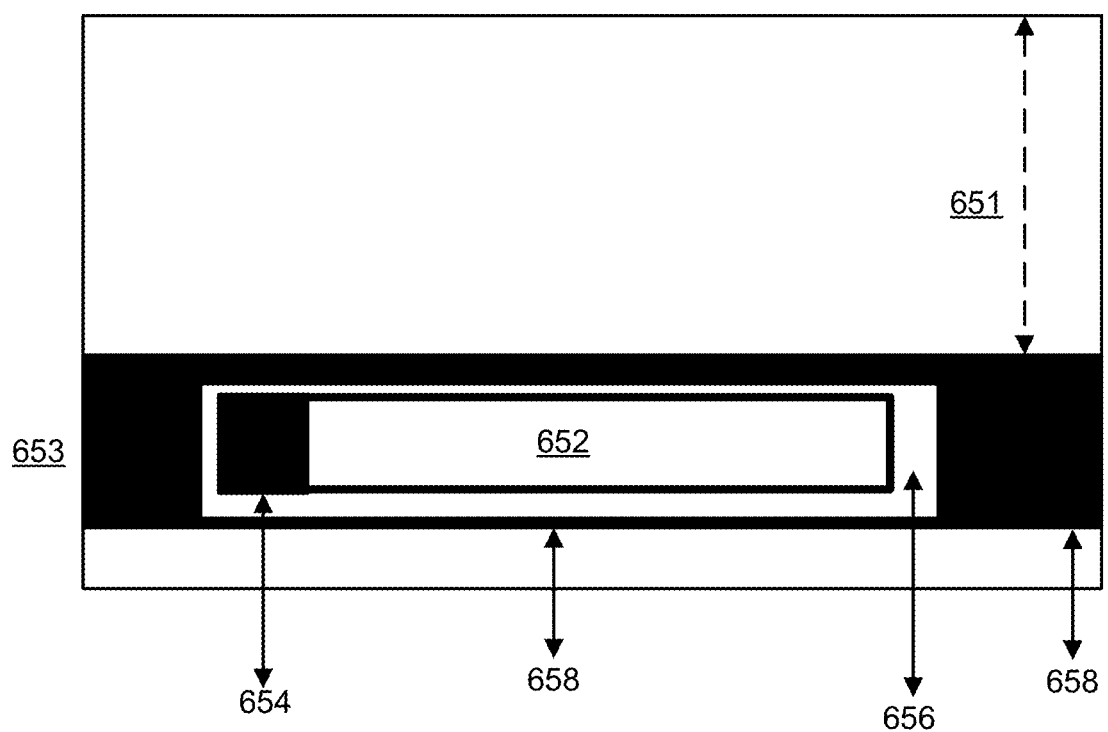
FIG. 6B is a block diagram illustrating a top view of the fourth example printing sheet described in FIG. 6A.

FIG. 6B is a block diagram illustrating a top view 650 of the fourth example printing sheet described in FIG. 6A.

As shown in the top view 650, the top portion 651 and the strip 653 represent the relative locations of the label portion and the wristband portion on the printing sheet.

Area 654 is a wristband adhesive tab area. Release agent is applied below the paper layer and adhesive is applied on the top side of the film 602. Adhesive is also applied to the bottom side of the paper layer 606 and the top side of the film layer 602. Tack down adhesive is applied to the arrowed area 658 to secure the film 602 to the paper 606.

In the embodiments described with reference to FIGS. 6A and 6B, in a top-down view, the attachment along the perimeter of the wristband is outside the purview of the window area formed by cutting out a portion of the paper layer, such that there is no break along the surface of the top layer. In these embodiments, due to the cut to the paper layer, the film layer is recessed. A wristband may be detached from a printing sheet by pushing the edges of the film layer downwards (as opposed to lifting the band upwards and away from the printing sheet). Alternatively, a wristband may be detached from a printing sheet by first turning the sheet bottom side up and then separating the wristband from the bottom carrier sheet.

In the implementations shown in FIGS. 6A and 6B, the wristband portion is secured to the printing sheet by applying adhesive to the entire area of the wristband portion and die-cutting a certain portion of the paper layer and the adhesive layer out of the printing sheet.

Figure 7A:
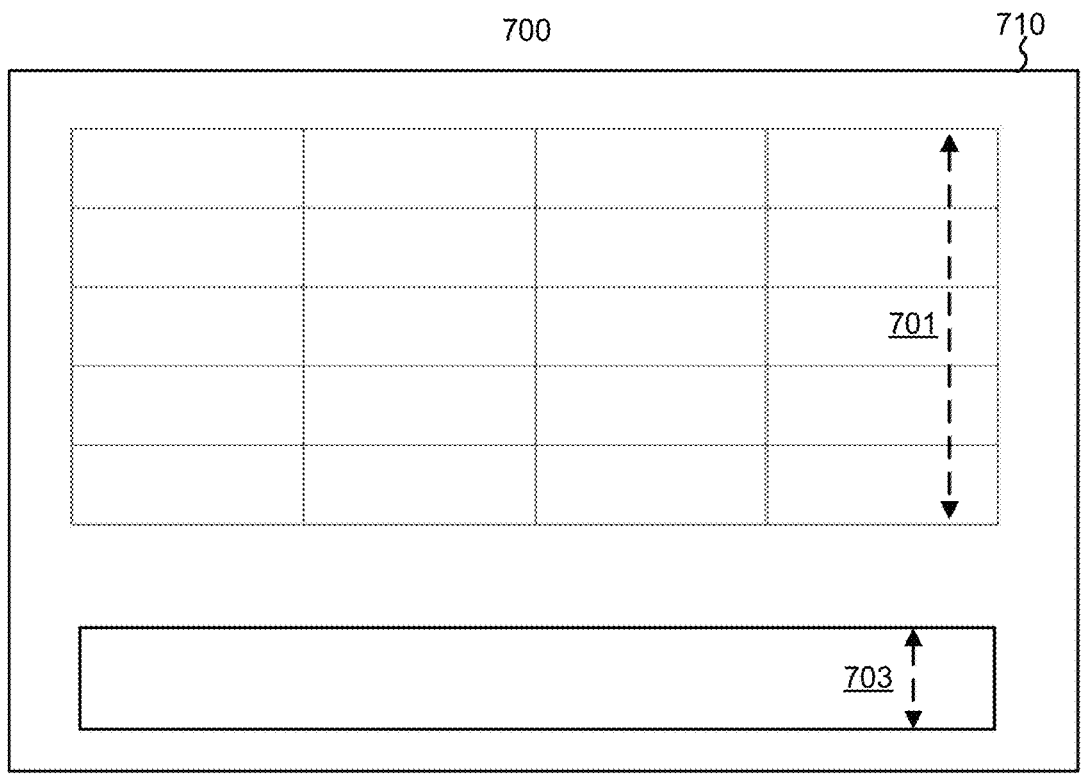
FIG. 7A is a block diagram illustrating a top view of a top sheet of a fifth example multi-layer printing sheet including a wearable band that is detachable from the printing sheet.

FIG. 7A is a block diagram illustrating a top view 700 of a top sheet 710 of a fifth example multi-layer printing sheet including a wearable band that is detachable from the printing sheet. As shown in FIG. 7A, the portion 731 may be laser receptive paper; and the portion 733 may be a laser receptive film.

Figure 7B:
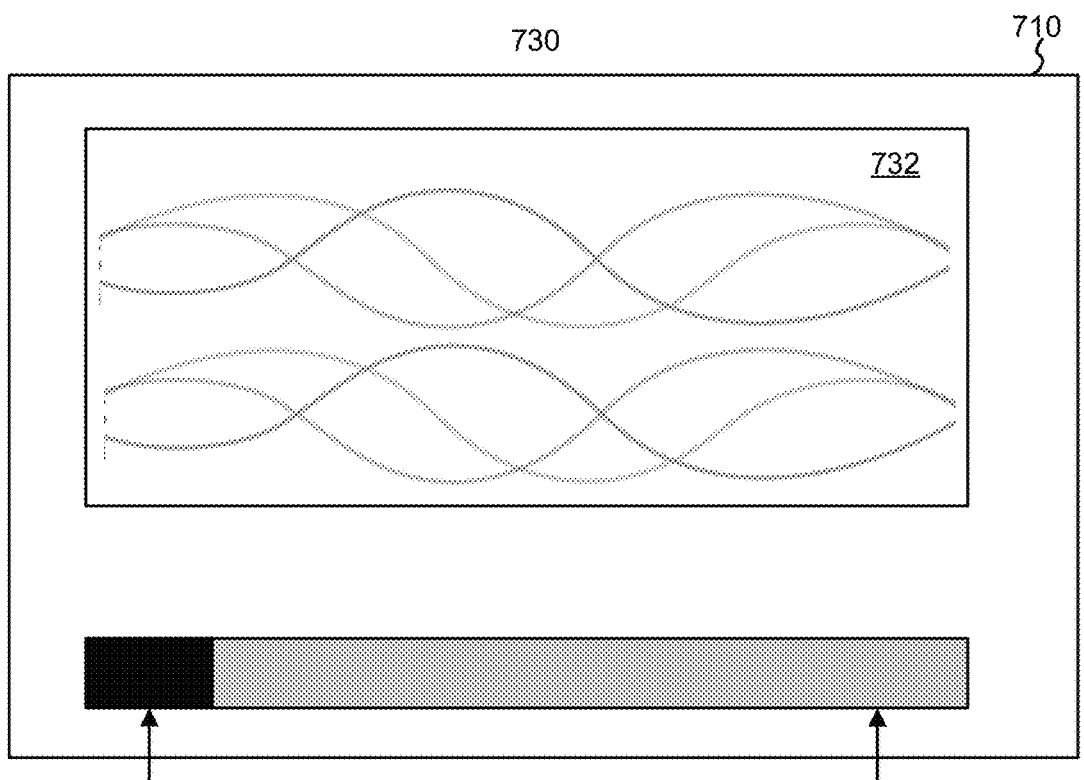
FIG. 7B is a block diagram illustrating a bottom view of the top sheet of the multi-layer printing sheet described in FIG. 7A.
Figure 7C:
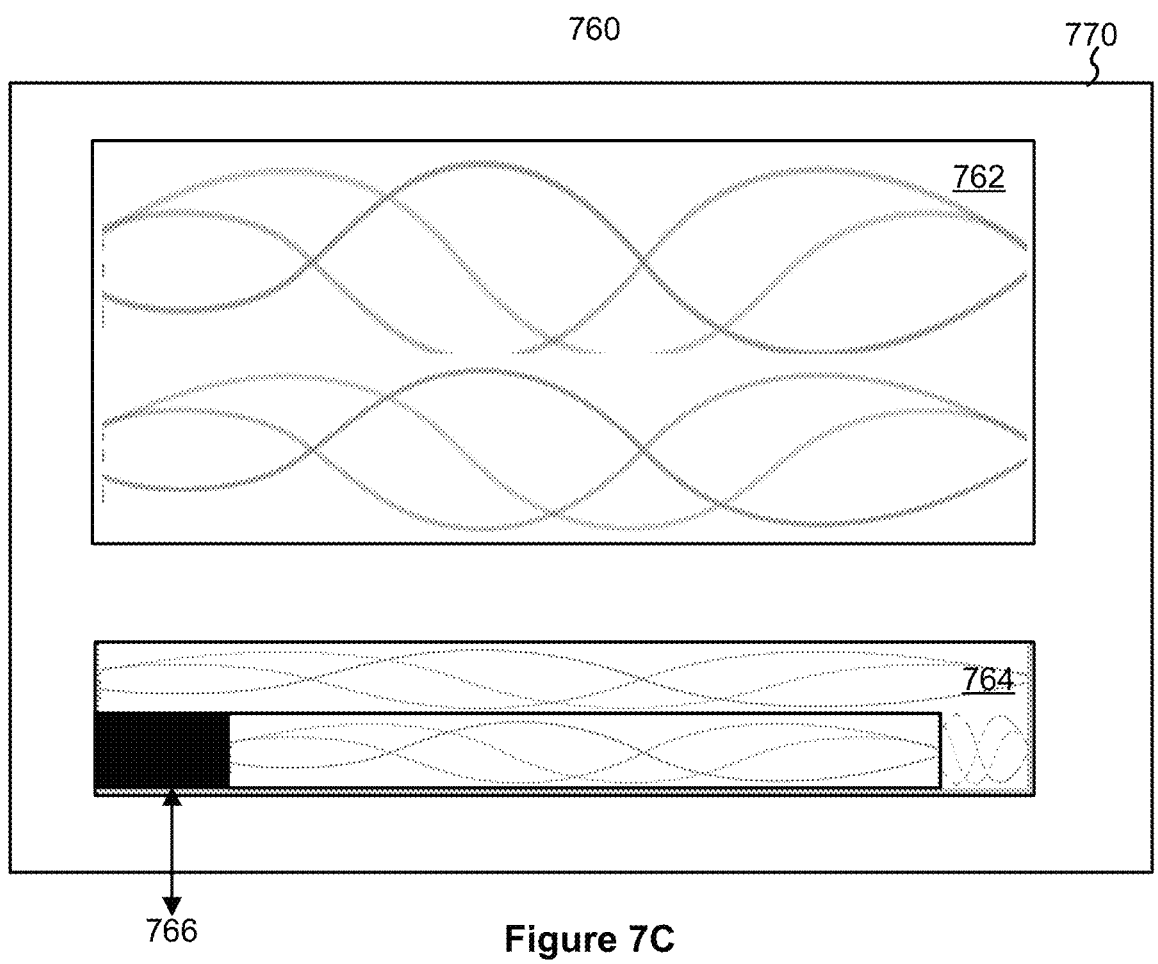
FIG. 7C is a block diagram illustrating a top view of a bottom sheet of the multi-layer printing sheet described in FIG. 7A.

FIG. 7B is a block diagram illustrating a bottom view 730 of the top sheet 710 described in FIG. 7A; FIG. 7C is a block diagram illustrating a top view 760 of a bottom sheet 770 of the multi-layer printing sheet described in FIGS. 7A and 8B.

In the embodiment shown in FIGS. 7B-7C, adhesive and a release coating are placed on both the top layer of a substrate and the bottom layer of an adjacent substrate (as opposed to placing adhesive and release coating on separate layers before merging the layers together). As shown in FIG. 7B, both adhesive and release coating are applied to the wristband area on the bottom side of the top sheet. And as shown in 7C, both adhesive and release coating are applied to the wristband area on the top side of the bottom sheet 770. For example, adhesive is applied to the areas 734 and 764 and the release agent is applied to the areas 736 and 766.

One of the technical advantages provided in this embodiment is that the wristband is tacked down to the bottom liner. In this embodiment, the adhesive would stay on the bottom layer. In this embodiment, there is an area at the ends of the wristband with release layer, which is needed to avoid tearing back the liner. It does not require a no or low tack adhesive.

In some embodiments, the release agent is a release chemical that has been approved by regulatory agencies as suitable for skin contact; and the printable substrate includes one or more antimicrobial additives. These embodiments are advantageous for use in a hospital or medical facility.

Any printable surface as serve as top layer; for example, laser printing papers that can be used in a hospital setting can serve as the top layer. The bottom layer may be a paper sheet. Clear ink may be applied between the two layers to smooth the connecting surface before a low or no tack adhesive is applied. Die cut may also be used to secure the wristband to the printing sheet.

Figure 8:
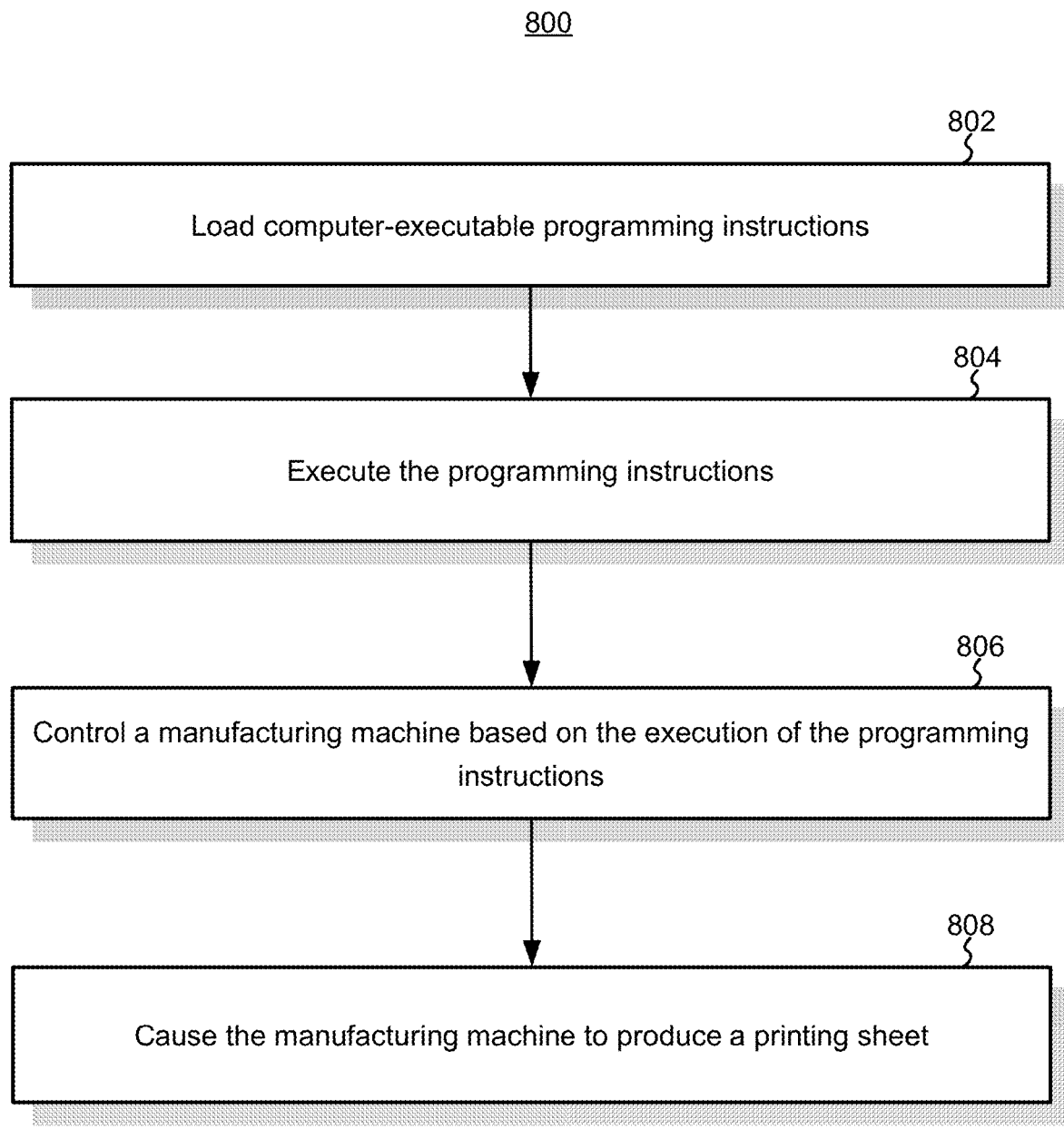
FIG. 8 is a flowchart illustrating an example method for manufacturing a multi-layer printing sheet.

FIG. 8 is a flowchart illustrating an example method for manufacturing a multi-layer printing sheet. The computer system 900 as described with reference to FIG. 9, when properly programmed, can execute the method 800.

In some implementations, the method 800 includes using a computer to load (802) computer-executable programming instructions from a non-volatile memory of the computer to a volatile memory of the computer. After loading the programming instructions, the computer may execute (803) the programming instructions using the volatile memory. Based on the execution of the programming instructions, the computer may control (806) a manufacturing machine, for example, a cutting machine, a pressing machine, or a printing machine. By controlling the manufacturing machine, the computer causes (808) the manufacturing machine to manufacture a multi-layer printing sheet as described in one or more of the implementations disclosed in the present disclosure.

Figure 9:
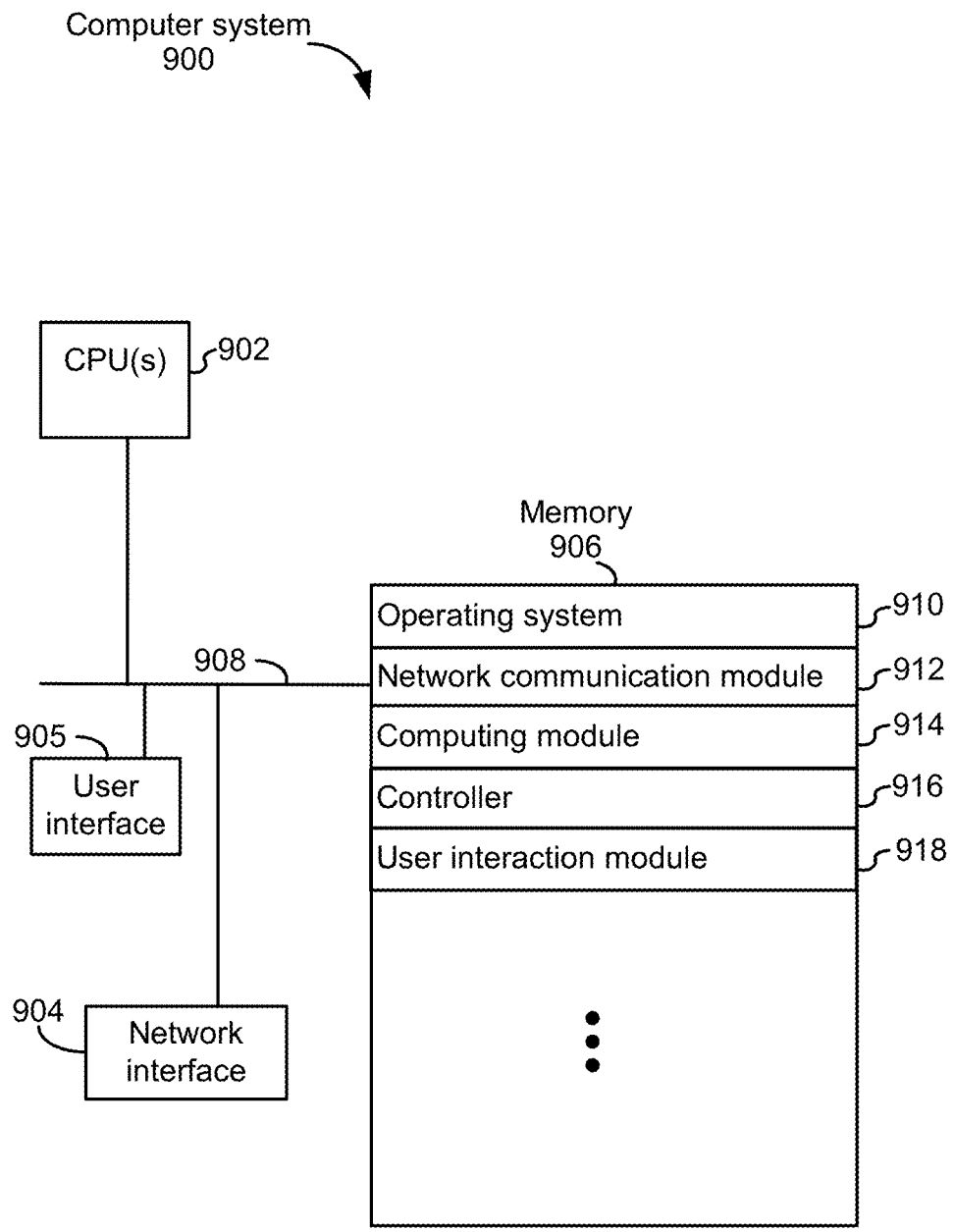
FIG. 9 is a block diagram illustrating an example computer system for manufacturing a multi-layer printing sheet.

FIG. 9 is a block diagram illustrating an example computer system 900 for manufacturing a multi-layer printing sheet. The computer system 900 in some implementations includes one or more processing units CPU(s) 902 (also referred to as processors), one or more network interfaces 903, optionally a user interface 905, a memory 906, and one or more communication buses 910 for interconnecting these components. The communication buses 910 optionally include circuitry (sometimes called a chipset) that interconnects and controls communications between system components. The memory 906 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 906 optionally includes one or more storage devices remotely located from the CPU(s) 100. The memory 906, or alternatively the non-volatile memory device(s) within the memory 906, comprises a non-transitory computer readable storage medium. In some implementations, the memory 906 or alternatively the non-transitory computer readable storage medium stores the following programs, modules and data structures, or a subset thereof:

- an operating system 910 (e.g., an embedded Linux operating system), which includes procedures for handling various basic system services and for performing hardware dependent tasks;
- a network communication module 912 for connecting the computer system 900 with a manufacturing machine via one or more network interfaces (wired or wireless);
- a computing module 913 for executing programming instructions;
- a controller 916 for controlling a manufacturing machine in accordance with the execution of programming instructions; and
- a user interaction module 918 for enabling a user to interact with the computer system 900.

In some implementations, the user interface 205 includes an input device (e.g., a keyboard, a mouse, a touchpad, a track pad, and a touch screen) for a user to interact with the system 900.

One or more of the above identified elements may be stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory optionally stores a subset of the modules and data structures identified above. Furthermore, the memory may store additional modules and data structures not described above.

Figure 10:
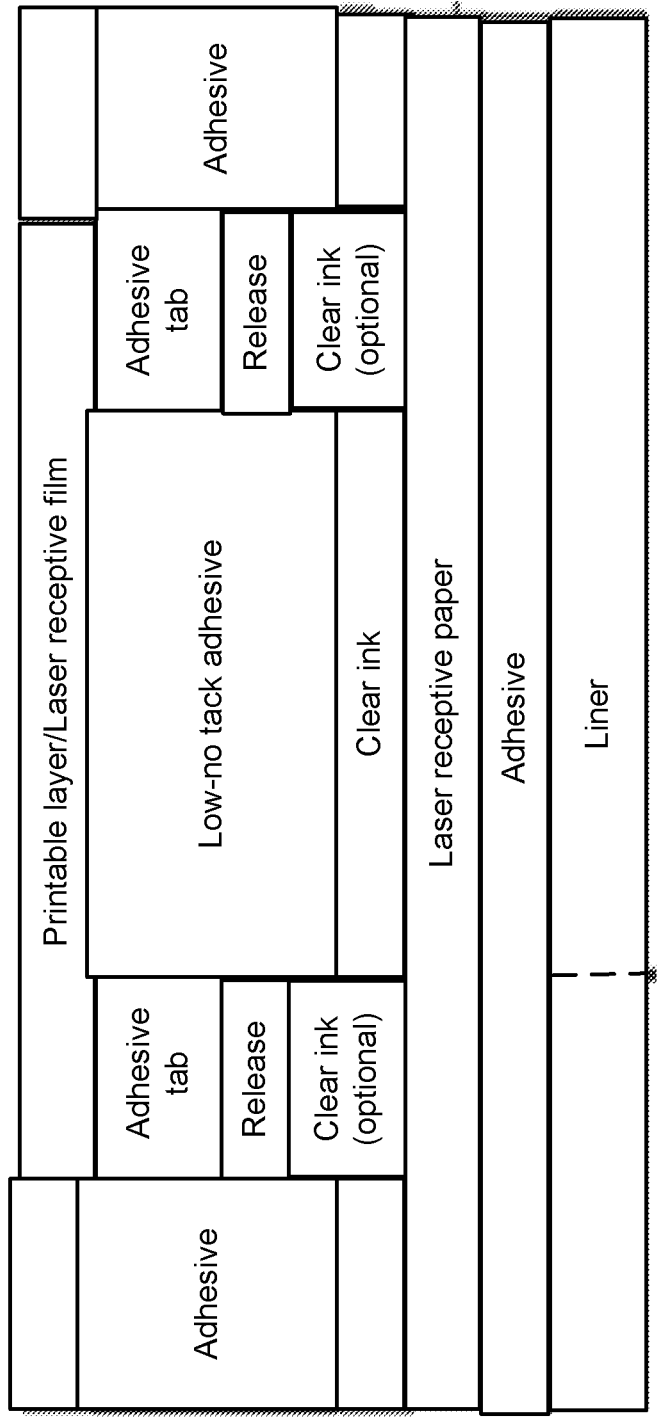
FIG. 10 is a block diagram illustrating a first example implementation of a multi-layer printing sheet.

FIG. 10 is a block diagram illustrating a first example implementation of a multi-layer printing sheet.

Figure 11:
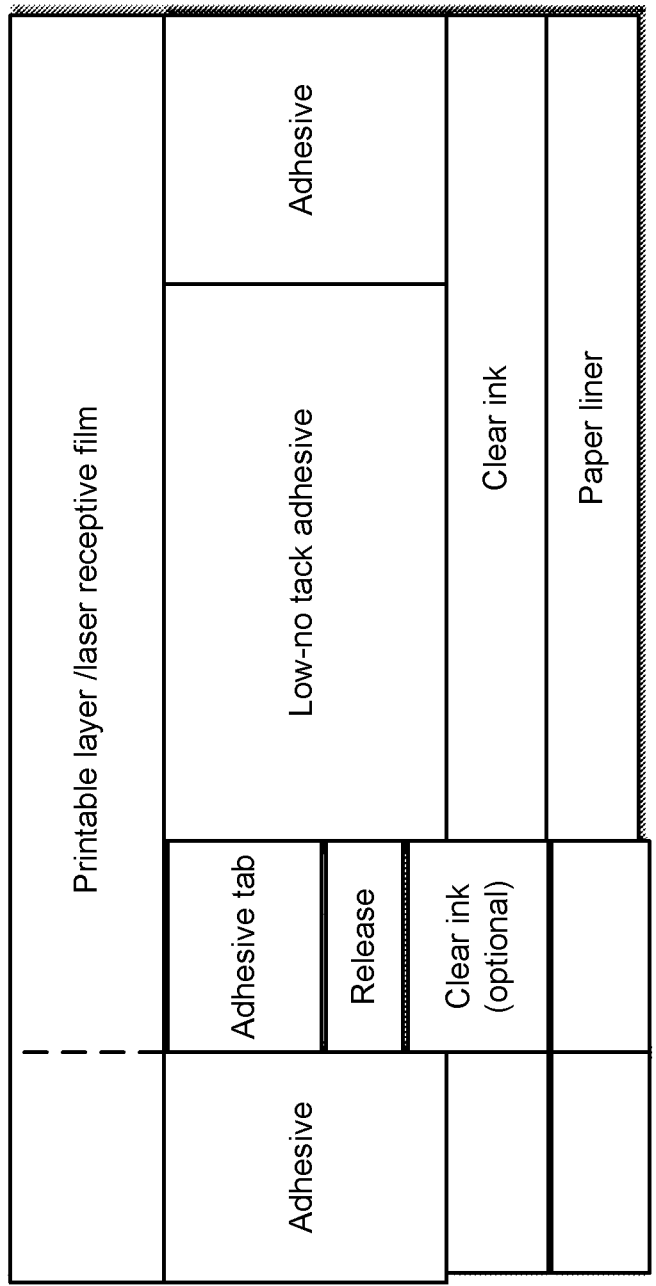
FIG. 11 is a block diagram illustrating a second example implementation of a multi-layer printing sheet.

In the concepts 1 and 2, as shown in FIGS. 10 and 11, respectively, wristband tab may come off the entire sheet, thereby exposing the wristband adhesive. Other implementation options include die-cutting through the liner in tab region only.

FIG. 11 is a block diagram illustrating a second example implementation of a multi-layer printing sheet. As shown in concept 2, the adhesive layer may be die-cut all the way through the release ink and liner. A user can separately remove the liner tab to expose the adhesive. Concept #2 differs from concept #1 in that the clear ink is applied to the liner instead of to the laser receptive paper labelstock; all other configurations may remain the same. Additionally, in concept #2, the adhesive tab may be die-cut all the way through the adhesive release ink and liner. Rather than exposing the adhesive when removing the wristband from the sheet, a user would expose the adhesive by pulling the liner off the wristband after removing the adhesive tab.

Optionally, the paper liner can be cut only in the tab area. The construction is die cut from bottom and up through to the adhesive layer. When the wristband is removed, the liner is still on the adhesive tab area. Liner is removed to expose adhesive tab for application of wristband.

Figure 12:
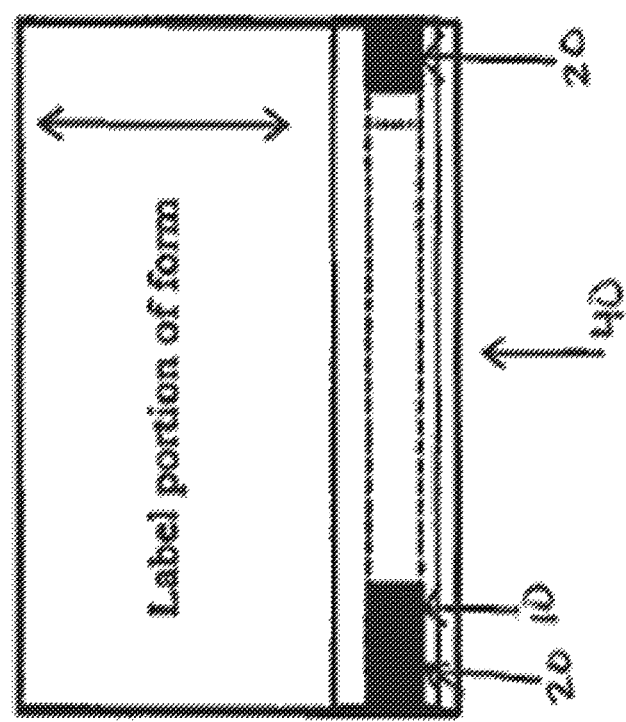
FIG. 12 is a block diagram illustrating a third example implementation of a multi-layer printing sheet.
Figure 12:
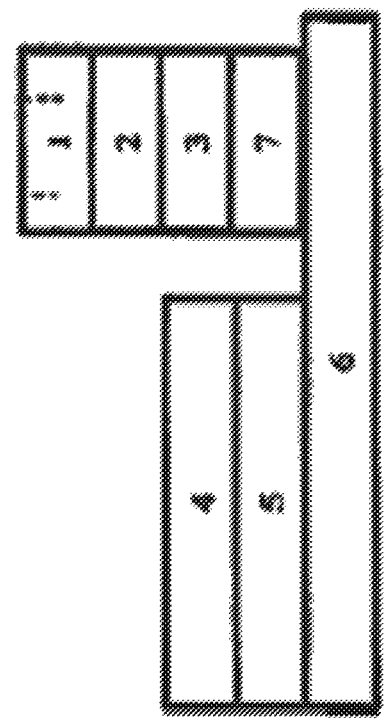

FIG. 12 is a block diagram illustrating a third example implementation of a multi-layer printing sheet. In the concept 3 shown in FIG. 12, the laser receptive film layer may be partially die-cut. Instead of cutting entirely through the laser receptive film layer, a partial die-cut (also referred to as a kiss-cut) is applied to the laser receptive film layer. Optionally, the paper liner can be cut only in the tab area. The construction is die cut from bottom and up through to the adhesive layer. When wristband is removed, the liner is still on the adhesive tab area. Liner is removed to expose adhesive tab for application of wristband. The partial die-cut feature shows in FIG. 12 may be applied to the concepts shown in FIGS. 10 and 11.

Figure 13:
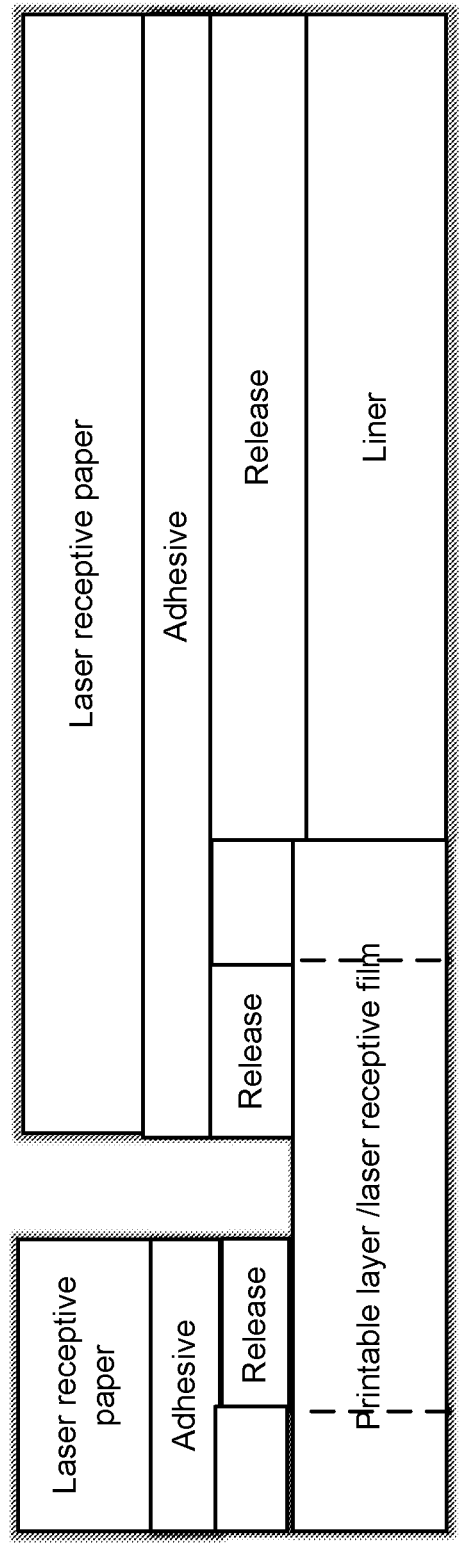
FIG. 13 is a block diagram illustrating a fourth example implementation of a multi-layer printing sheet.

FIG. 13 is a block diagram illustrating a fourth example implementation of a multi-layer printing sheet.

The concept 3 shown in FIG. 13 includes features that can be applied to concepts 1 and 2. Namely, adding a "partial die cut" (a cut that does not go all the way through the layer) or "perforation" (a cut that goes through layer) to top layer. A regular "die cut" may also be referred to as a "score." Technical benefits of provided by applied a partial die cut to the top layer include: further anchoring the laser printable wristband—without the use of tack down adhesive.

Figure 14:
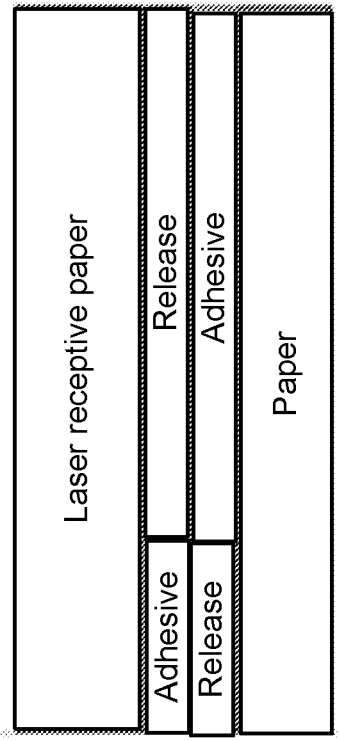
FIG. 14 is a block diagram illustrating a fifth example implementation of a multi-layer printing sheet.
Figure 14:

FIG. 14 is a block diagram illustrating a fifth example implementation of a multi-layer printing sheet.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a first layer could be termed a second layer, and, similarly, a second layer could be termed a first layer, without changing the meaning of the description, so long as all occurrences of the "first layer" are renamed consistently and all occurrences of the "second layer" are renamed consistently. The first layer and the second layer are both layers, but they are not the same layer.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A printing sheet, comprising:
   a die-cut or perforated printable film portion;
   an adhesive layer;
   a clear ink layer; and
   a bottom layer.

2. The printing sheet of claim 1, wherein the printable film portion is die-cut or perforated to form a band shape.

3. The printing sheet of claim 2, wherein there is a release layer between the adhesive layer and the bottom layer or between the adhesive layer and the clear ink layer.

4. The printing sheet of claim 3, wherein a portion of the printing sheet includes a die-cut printable paper portion, the die-cut printable paper portion comprising a printable paper layer having one or more labels die-cut into it, the printable paper layer being connected to the bottom layer via an adhesive.

5. The printing sheet of claim 4, wherein there is a release between the adhesive layer and the bottom layer of the die-cut printable paper portion.

6. The printing sheet of claim 2, where a portion of the adhesive layer underneath the die cut shape is absent.

7. The printing sheet of claim 1, wherein the adhesive layer includes a low tack adhesive portion.

8. The printing sheet of claim 7, wherein the adhesive layer includes a release layer underneath a portion of the adhesive layer.

9. The printing sheet of claim 8, wherein the bottom layer comprises a printable paper layer, an adhesive layer, and a liner layer.

10. The printing sheet of claim 9, wherein a portion of the printing sheet includes one or more labels die cut into the paper layer.

11. The printing sheet of claim 9, where a portion of the liner layer with release coating attached to it and adhesive attached to the release coating is also attached to a laser receptive paper.

12. The printing sheet of claim 1, wherein there is a release layer underneath at least a portion of the clear ink layer.

13. The printing sheet of claim 12, wherein a portion of the printing sheet includes a die-cut printable paper portion with a printable paper layer having one or more labels die-cut into it, the printable paper layer connected to the bottom layer via an adhesive.

14. The printing sheet of claim 1, wherein the die-cut or perforated printable film portion is partially die-cut or perforated.

15. The printing sheet of claim 1, wherein the die-cut or perforated printable film portion is configured to be printed with an image or an encrypted text.

16. The printing sheet of claim 15, wherein the image or the encrypted text identifies an individual receiving medical care at a medical facility.

17. The printing sheet of claim 15, wherein the image or the encrypted text is configured to be read by a mobile or stationary scanner to identify an individual receiving medical care at a medical facility.

18. The printing sheet of claim 15, wherein the image or the encrypted text is configured to be read by a camera installed on a mobile phone.

* * * * *